(12) United States Patent
Koeling et al.

(10) Patent No.: US 7,832,328 B2
(45) Date of Patent: Nov. 16, 2010

(54) SYSTEM WITH A FLUID PATH RESTRICTION FOR MAKING A BEVERAGE

(75) Inventors: Hendrik Cornelis Koeling, Amersfoort (NL); Gustaaf Frans Brouwer, Nijkerk (NL)

(73) Assignee: Sara Lee/DE N.V., Utrecht (NL)

( * ) Notice: Subject to any disclaimer, the term of this patent is extended or adjusted under 35 U.S.C. 154(b) by 520 days.

(21) Appl. No.: 11/660,076

(22) PCT Filed: Aug. 12, 2005

(86) PCT No.: PCT/NL2005/000589

§ 371 (c)(1),
(2), (4) Date: Jul. 27, 2007

(87) PCT Pub. No.: WO2006/016814

PCT Pub. Date: Feb. 16, 2006

(65) Prior Publication Data

US 2008/0050488 A1    Feb. 28, 2008

(30) Foreign Application Priority Data

Aug. 12, 2004    (NL) .................................... 1026834

(51) Int. Cl.
*A47J 31/06*    (2006.01)
(52) U.S. Cl. ..................... 99/284; 99/302 R; 99/289 R; 99/295
(58) Field of Classification Search ............... 99/289 R, 99/295, 302 R, 284
See application file for complete search history.

(56) References Cited

U.S. PATENT DOCUMENTS 3,433,464 A    3/1969    Swafford et al.
3,450,024 A    6/1969    Martin
4,253,385 A    3/1981    Illy (Continued)

FOREIGN PATENT DOCUMENTS

CH           458099         8/1968

(Continued)

OTHER PUBLICATIONS

International Search Report for PCT/NL2006/000356, date of mailing, Oct. 13, 2006, 3 pages.

(Continued)

*Primary Examiner*—Reginald L Alexander
(74) *Attorney, Agent, or Firm*—Foley & Lardner LLP (57) ABSTRACT

A system for making a beverage, the system comprising a pad (7) and a holder (6) in which the pad (7) is placed in use, the pad being provided with a chamber in which a product (24) required for making the beverage is situated, the system defining, at least partly, a fluid path, while the fluid path extends, in use, at least through the product (24) in the pad (7), while in use a fluid is introduced into the fluid path under super-atmospheric pressure, wherein the system is designed for assuming two conditions, i.e. a froth condition in which a beverage with a froth layer is produced, and a froth-free condition in which a beverage substantially without froth layer is produced. Also is described a restriction element (15a, 16, 18, 19, 20) and a pad (7) and the use of such a system as a method for making beverage.

24 Claims, 6 Drawing Sheets

U.S. PATENT DOCUMENTS

| | | | |
|---|---|---|---|
| 4,446,158 A | | 5/1984 | English et al. |
| 4,694,740 A | | 9/1987 | Daloz et al. |
| 4,801,464 A | | 1/1989 | Hubbard, Jr. |
| 4,996,066 A | | 2/1991 | Love et al. |
| 5,043,172 A | | 8/1991 | Loizzi |
| 5,082,676 A | | 1/1992 | Love et al. |
| 5,150,645 A | | 9/1992 | Schiettecatte |
| 5,249,509 A | | 10/1993 | English |
| 5,265,519 A | | 11/1993 | Schiettecatte et al. |
| 5,477,775 A | | 12/1995 | Delhom et al. |
| 5,518,743 A | | 5/1996 | Pergola et al. |
| 5,634,394 A | * | 6/1997 | Cortese ................ 99/295 |
| 5,638,740 A | | 6/1997 | Cai |
| 5,870,943 A | * | 2/1999 | Levi et al. ............. 99/287 |
| 5,895,672 A | | 4/1999 | Cooper |
| 5,913,962 A | | 6/1999 | Gasser et al. |
| 6,004,593 A | | 12/1999 | Soughan |
| 6,009,792 A | | 1/2000 | Kraan |
| 6,499,689 B1 | | 12/2002 | Miyazaki |
| 6,769,352 B2 | | 8/2004 | de Bruin et al. |
| 6,777,007 B2 | | 8/2004 | Cai |
| 6,784,850 B2 | | 8/2004 | Morooka et al. |
| 6,840,158 B2 | | 1/2005 | Cai |
| 7,234,390 B2 | * | 6/2007 | Fulgoni et al. ........... 99/323 |
| 2001/0053399 A1 | | 12/2001 | Herod |
| 2004/0083898 A1 | | 5/2004 | Doglioni |
| 2004/0107841 A1 | * | 6/2004 | Cai ..................... 99/302 R |
| 2004/0244599 A1 | | 12/2004 | Wei |
| 2005/0003060 A1 | | 1/2005 | Steenhof et al. |
| 2005/0150391 A1 | * | 7/2005 | Schifferle ............... 99/295 |
| 2005/0158426 A1 | | 7/2005 | Hu et al. |
| 2006/0219098 A1 | * | 10/2006 | Mandralis et al. .......... 99/279 |
| 2007/0289453 A1 | * | 12/2007 | Halliday et al. .......... 99/295 |
| 2007/0292584 A1 | * | 12/2007 | Arrick et al. ............ 426/564 |

FOREIGN PATENT DOCUMENTS

| | | | |
|---|---|---|---|
| DE | 40 37 366 A1 | | 5/1992 |
| DE | 42 13 895 A1 | | 11/1992 |
| DE | 44 24 835 A1 | | 1/1996 |
| EP | 0615921 A1 | | 9/1994 |
| EP | 1101430 A1 | | 5/2001 |
| EP | 1 210 893 A2 | | 6/2002 |
| EP | 1554958 | | 7/2005 |
| EP | 1579793 | | 9/2005 |
| GB | 989996 | | 4/1965 |
| JP | 03169311 | | 7/1991 |
| JP | 06315437 | | 11/1994 |
| NL | 7215523 | | 5/1974 |
| NL | 1013270 | | 4/2001 |
| WO | WO 89/12416 A2 | | 12/1989 |
| WO | WO98/56286 | | 12/1998 |
| WO | WO 00/51478 | | 8/2000 |
| WO | WO 02/074143 A2 | | 9/2002 |
| WO | WO2004/052158 | | 6/2004 |
| WO | WO 2004/052158 | * | 6/2004 |
| WO | WO 2004/056246 A1 | | 7/2004 |
| WO | WO 2005/016095 A1 | | 2/2005 |
| WO | WO 2005/018394 A1 | | 3/2005 |
| WO | WO 2005/058109 A1 | | 6/2005 |
| WO | WO 2005/063094 A1 | | 7/2005 |
| WO | WO 2006/016814 | | 2/2006 |
| WO | WO 03/059778 | | 7/2006 |
| WO | WO 2008/018793 A2 | | 2/2008 |

OTHER PUBLICATIONS

International Preliminary Report on Patentability and Written Opinion of WO 2008/018793, dated Feb. 10, 2009, 6 pages.

International Preliminary Report on Patentability and Written Opinion of WO 2008/018794, dated Feb. 10, 2009, 9 pages.

* cited by examiner

SYSTEM WITH A FLUID PATH RESTRICTION FOR MAKING A BEVERAGE

The invention relates to a system for making a beverage, the system comprising a pad and a holder in which the pad is placed in use, the pad being provided with a chamber in which a product required for making the beverage is situated, the system determining, at least partly, a fluid path, which fluid path extends, in use, at least through the product in the pad, while in use a fluid is introduced into the fluid path under super-atmospheric pressure.

Such a system is known per se and can be designed as a coffee maker. The coffee maker comprises a water reservoir, a feed-through and a pressure chamber, in which, in use, a coffee pad is located. In the known device, at the bottom of the pressure chamber, which pressure chamber is bound there by the holder, a restriction is provided in the holder in the form of a nozzle which, in use, forms a coffee extract jet and spouts into a froth chamber. In the froth chamber, a frothed coffee is formed which, via an outlet, flows into a cup or such beverage holder, whereupon the coffee, provided with a froth layer, is ready for consumption.

A drawback of the known system is that the system is understood to be unsuitable for making beverages which are usually consumed without a froth layer, for instance tea.

The object of the invention is to obviate this drawback.

This object is achieved with the aid of the invention which is characterized in that the system is designed for assuming two conditions, i.e. a froth condition, in which a beverage with a froth layer is produced, and a froth-free condition, in which a beverage is produced substantially without froth layer, while with the system in the froth condition, in the fluid path, a froth restriction is provided substantially determining the fluid flow rate, which restriction is situated downstream of the product and which forms a fluid jet such that a froth layer is formed, while with the system in the froth-free condition, in the fluid path, a froth-free restriction is provided substantially determining the fluid flow rate, which restriction does not form a froth-forming fluid jet.

Due to the froth-free restriction, the flow rate can be restricted, so that when preparing a froth-free beverage, the amount of obtained beverage is approximately equal to the amount of beverage with a froth layer when the system is used in the froth condition. As a result, the system can be suited both for brewing beverages which are usually consumed without froth layer, such as tea and a number of types of coffee, and for making beverages which are usually consumed with a froth layer, such as other types of coffee.

One embodiment of the system according to the invention is characterized in that the system is provided with a first holder, removable from the system, containing a froth restriction for making the froth drink. Such a holder has as an advantage that it can easily be inserted into and removed from the system, which therefore implies that inserting and removing the froth restriction is simple. In general, such a holder will be used for making coffee.

A further elaboration of the system according to the invention is characterized in that the system is provided with a second holder removable from the system, which does not contain a froth restriction, for preparing the froth-free beverage.

Further, it is possible to provide for a system with the first as well as the second holder. It is preferred to design the holders to be exchangeable. If a beverage with froth layer is desired, the first holder can be used. If a beverage without froth layer is desired, the second holder can be used.

It is also possible that the system comprises a froth restriction-comprising restriction element, while the first holder can be formed from an assembly of the second holder and the restriction element. An advantage thereof is that the holder needs not be replaced in its entirety when the system is readied for preparing a beverage without froth after preparing a beverage with a froth layer.

Further, an embodiment of the system according to the invention is possible which is characterized in that the froth-free restriction forms part of the pad. This is especially advantageous with pads for making a beverage of which it is determined in advance that it is consumed without froth.

Also, in one embodiment of the system according to the invention, it is possible that the froth-free restriction is located in a part of the fluid path upstream of the pad. As a rule, there is more space available in the fluid path upstream of the path for placing such a froth-free restriction. In this embodiment, the froth-free restriction is preferably included in the pressure chamber bounded by the holder and the lid which closes off the holder, in which pressure chamber the pad is also situated.

Further, the froth-free restriction can form part of a beverage preparing device while the system is accommodated in a system of ducts of the beverage preparing device which determines a part of the fluid path that is located upstream of the pad. Consequently, it is possible to form a system according to the invention with the aid of an already existing beverage preparing device.

One embodiment of the system according to the invention can further comprise a froth-free restriction-comprising restriction element. Preferably, this restriction element is removable from any other part of the system. Such a restriction element can be designed to be small which is advantageous as a user needs not remove and/or provide large parts when using the system.

In a further elaboration of the latter embodiment, it is possible that for preparing the froth-free beverage, the froth-free restriction element forms an assembly with the pad. This can be done, for instance, by placing the restriction element upstream of the pad against the pad in the holder.

The restriction element can for instance be designed as a cap, which is advantageous because an inside shape of the cap can easily be adjusted to an outside shape of the pad.

The froth-free restriction can be manufactured from a semi-permeable material. With a suitably chosen thickness, the flow resistance can be suited to serve as restriction. An advantage hereof is that it is simple to design a pad with such a semi-permeable material.

It is further possible to provide an embodiment of the system with a froth-free restriction which is switchable, while the froth-free restriction can be switched between a restricting position and a free position. Such a restriction can be made operable in a simple manner, for instance with the aid of a button. It is also possible that a sensor is present in the system for detecting the product in a pad placed in the system. In such a case, data processing means determine, for instance, which beverage will be prepared with the aid of the pad and are further designed to switch the froth-free restriction in a froth-free position or in a free position—i.e., in a position where is does not form a restriction—according to what is desired for making the beverage.

The invention further relates to an assembly provided with a holder, a pad and a restriction element evidently suitable for use in a system according to various embodiments disclosed herein.

The invention also relates to a restriction element evidently suitable for use in an assembly or a system according to various embodiments disclosed herein.

The invention further relates to a pad, which pad is evidently suitable for use in a system according to various embodiments disclosed herein. Such a pad can comprise a froth-free restriction. Here, the froth-free restriction can be designed from semi-permeable material. With a suitable chosen thickness, the flow resistance can be suited to serve as restriction. An advantage hereof is that is it simple to design a pad with such a semi-permeable material.

The invention further relates to the use of a system for making a beverage, and to a method for making beverages utilizing a system according to various embodiments disclosed herein.

The invention will presently be further elucidated on the basis of a number of exemplary embodiments, with reference to the drawing.

Figure 1:
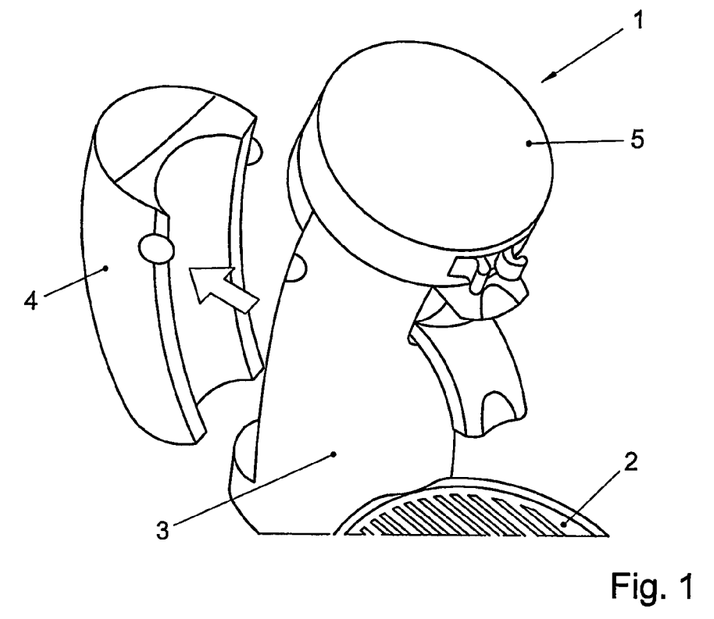
FIG. 1 shows a perspective view of a beverage preparing device.
Figure 2:
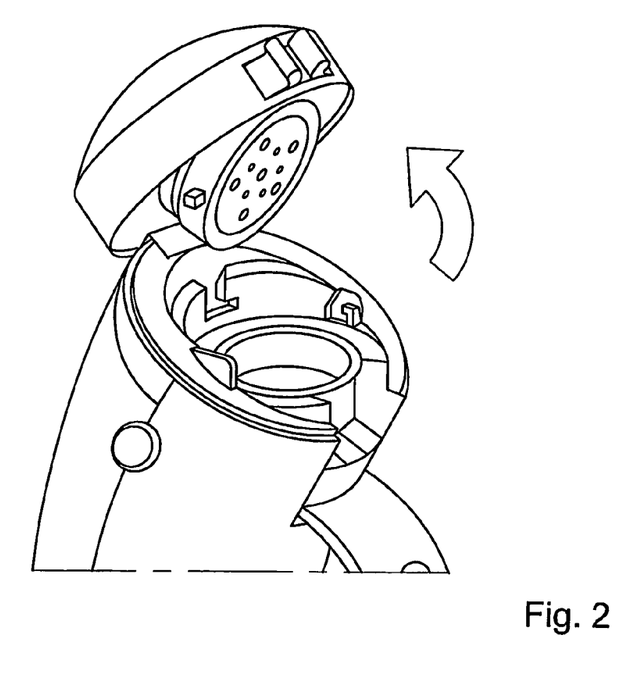
FIG. 2 shows the beverage preparing device of FIG. 1 with the lid open.
Figure 3:
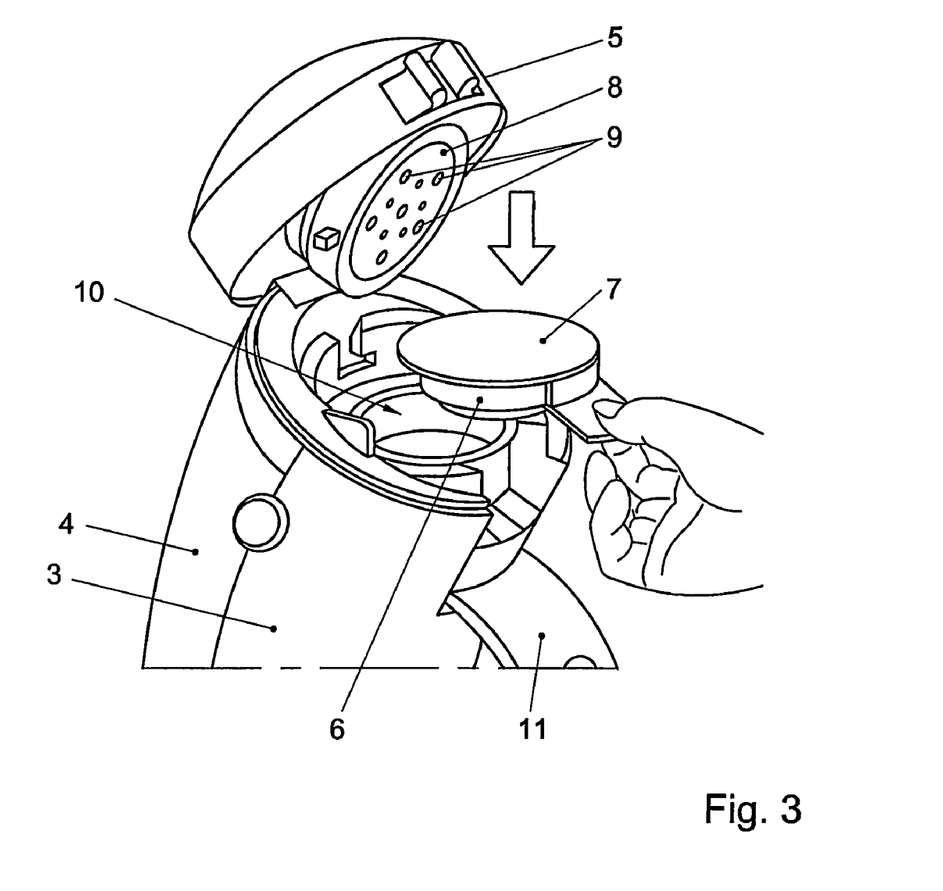
FIG. 3 shows the beverage preparing device of FIG. 1 while a holder with pad is being placed.

FIG. 1 shows an exemplary embodiment of a coffee maker of which the system according to the invention forms part. The coffee maker 1 comprises a foot 2 on which one or two cups can be disposed. The coffee maker further comprises a housing 3 and a water reservoir 4 which, in the present exemplary embodiment, is detachably connected to the housing 3, so that it can be filled with water in a simple manner. To the housing 3, a closable lid 5 is hingedly connected. When the lid 5 is opened, which is represented in FIG. 2, access is obtained to the internal part of the coffee maker. As represented in FIG. 3, in this internal part, a holder 6 can be placed, which holder 6 contains a pad 7. The pad is filled with a product such as coffee powder, tea, milk powder, cocoa or a combination of such products. The lid 5 is provided with an internal closing lid 8 which, in closed condition, closes off the topside of the holder 6 with the pad 7 received therein. In the internal closing lid 8, supply openings 9 are present for supplying water under super-atmospheric pressure to the chamber formed by the internal closing lid 8 and the holder 6, in which chamber the pad 7 is received. Adjacent the bottom side, the holder 6 is provided with at least one outflow opening through which water, having been pressed through the product situated in the pad 7, can exit from the holder. From the holder, the thus prepared beverage flows into a chamber 10 to which an outflow 11 is connected. From the outflow 11, the beverage flows into the mugs or cups disposed thereunder.

Figure 4:
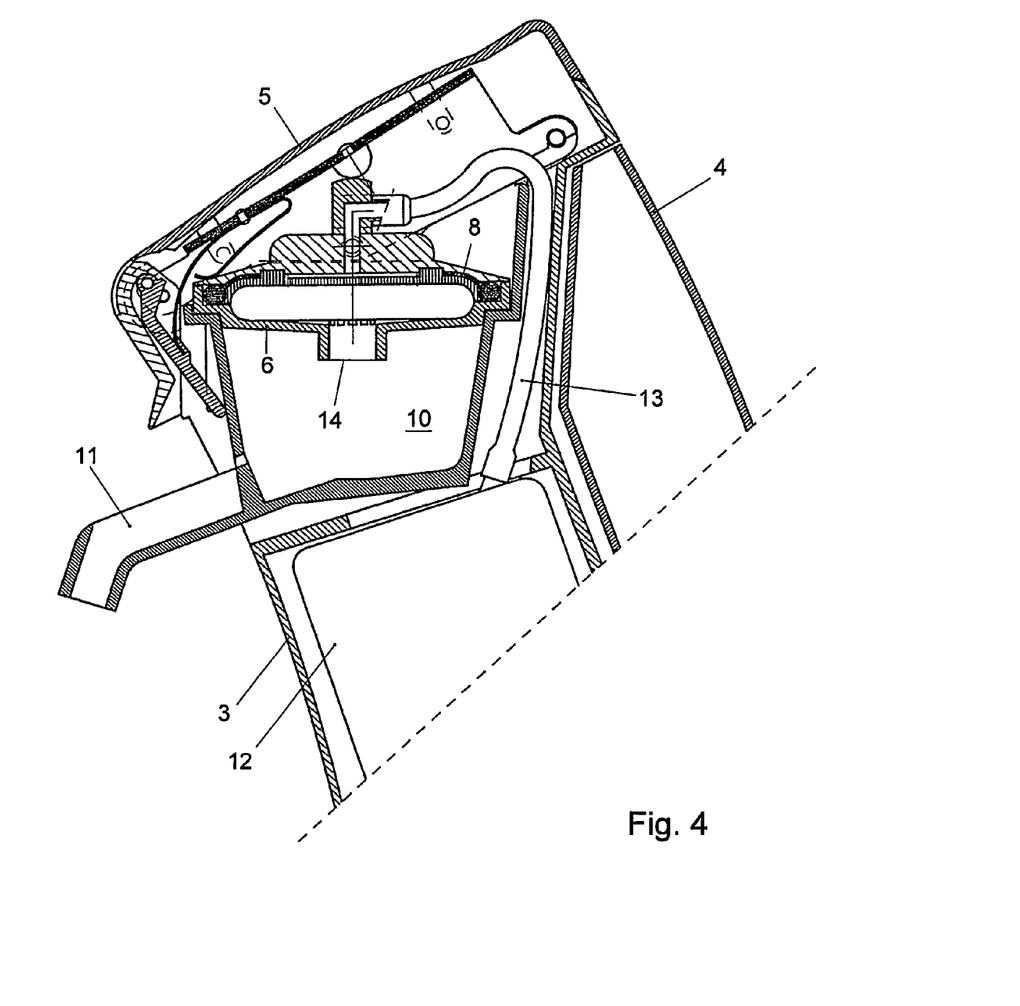
FIG. 4 shows a longitudinal cross-section of a similar beverage preparing device as represented in FIG. 1.
Figure 5:
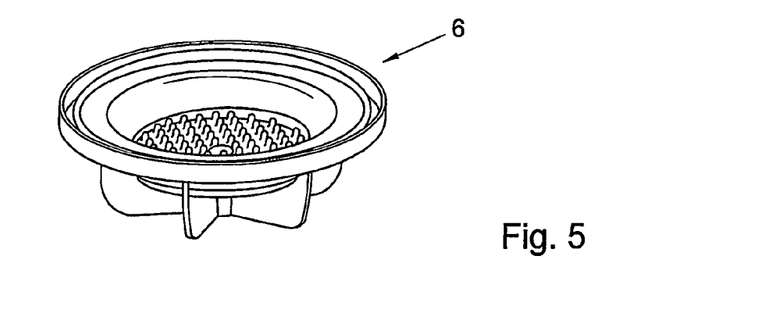
FIG. 5 shows an exemplary embodiment of a holder for a pad, in perspective.
Figure 6:
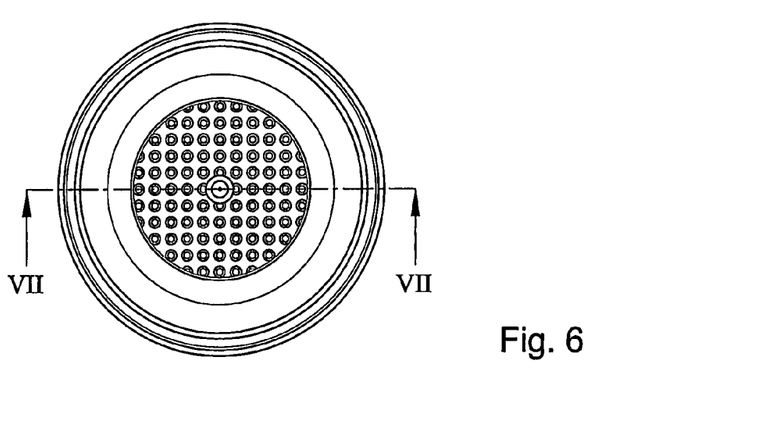
FIG. 6 shows the holder of FIG. 6 in top plan view.
Figure 7:
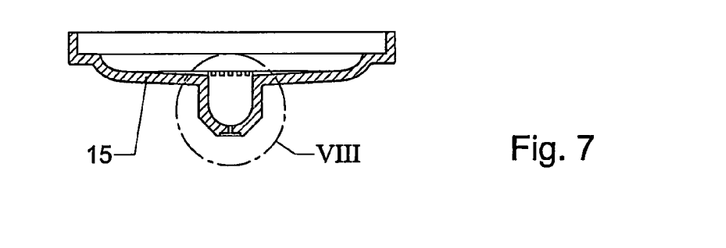
FIG. 7 shows the holder of FIG. 5 in cross-section.
Figure 8:
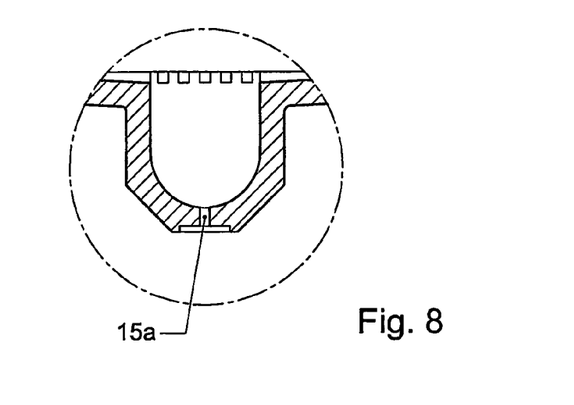
FIG. 8 shows in more detail the froth forming, fluid jet forming restriction of the holder of FIGS. 5-7.
Figure 9:
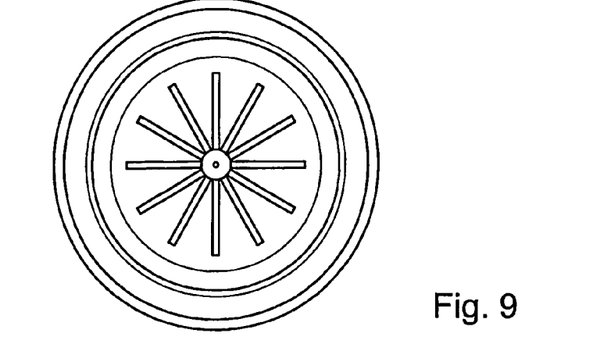
FIG. 9 shows a top plan view of an alternative embodiment of a holder for a pad.

FIG. 4 shows a vertical longitudinal cross-section of the top part of the coffee maker, while the same reference numerals are used as when reference was made to FIGS. 1-3. Clearly visible is the housing 3, the water reservoir 4, the lid 5, the holder 6, the internal closing lid 8 and the outflow 11. Further, the chamber 10 in which the beverage flows which is pressed through the product is clearly visible. In order to create the super-atmospheric pressure, a pump 12 is provided which is connected by an access to the water reservoir 4 and an exit of which is in fluid communication, via a fluid duct 13, with the interior of the holder 6.

Figure 10:
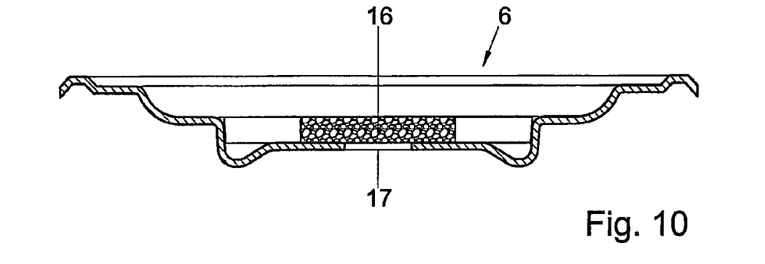
FIG. 10 shows a cross-sectional view of a holder provided with a froth-free restriction.

As has already appeared from the introduction to this specification, an object of the invention is to enable one system to prepare both a beverage with froth and a beverage without froth. The beverage provided with froth can for instance be coffee, and the froth-free beverage can for instance be tea. It is however also an option that the froth-free beverage is coffee, for instance when a user prefers coffee without froth. As already disclosed, the holder for the production of a beverage with froth, such as for instance coffee, is provided with a froth restriction which is situated downstream of the product located in the pad. This froth restriction forms a fluid jet such that a froth layer is formed. The fluid jet impacts the bottom of the chamber 10 while a stable froth is obtained.

When such a device were to be used for making tea, for instance in that instead of a pad filled with coffee powder, a pad filled with tea would be placed in the holder 6, tea is obtained with a froth layer, which is usually not desired. For making other beverages too, it is often undesired that then a froth layer is formed. To prepare a substantially froth-free beverage, the present invention provides a system which can be brought into a condition in which, in the fluid path, a froth-free restriction is provided substantially determining the fluid flow rate and which does not form a froth forming fluid jet and.

As, with the system in the froth-free condition, a restriction is present substantially determining the fluid flow rate, it is effected that not too much beverage is produced in a particular period of time. As, the respective restriction does not form a froth forming fluid jet, furthermore, the formation of froth is prevented. Generally, it will be such that in the froth-free condition of the system use is made of a different holder for the pad which is not provided with a froth restriction. This unlike the holder which is intended for placing a coffee pad therein for the purpose of making coffee with a froth layer.

The absolute pressure at which the water is supplied to the chamber bounded by the internal closing lid 8 and the holder 6, is preferably, when coffee with froth is prepared, in the range of 1-2 bar. The froth-free restrictions may be accommodated on various positions in the fluid path, i.e. upstream of the product situated in the pad and downstream of the product situated in the pad, as long as this restriction does not form a fluid jet causing froth. In FIG. 4, the holder 6 is provided with a relatively large outflow opening 14 which does not form a fluid flow rate determining restriction in the system. Neither will this outflow opening form a froth forming fluid jet, and the fluid restriction is positioned elsewhere in the exemplary embodiment of FIG. 4. FIGS. 5-9 show exemplary embodiments of a holder 6 already known per se which is provided with a bottom 15 with a relief structure for forming grooves along which the beverage can flow to a fluid jet forming restriction 15a (see FIG. 8). For an exhaustive description of the holder 6 shown in FIGS. 5-9, reference is made to the European patent application EP-A-0 904 717. As indicated in FIG. 4, with the holder intended for making a froth-free beverage, no froth-forming fluid jet restriction 15a is provided, and the fluid flow rate will have to be restricted in a different manner such that no froth is formed. To this end, a number of examples will be given with reference to FIGS. 10-14.

FIGS. 10 shows a holder 6, while the bottom is provided with a sintered portion 16 while, thereunder, a relatively wide outflow opening 17 is provided. Here, the sintered portion 16 forms the fluid flow rate determining froth-free restriction. It is clear that this sintered froth-free restriction 16 is located downstream of the product.

Figure 11:
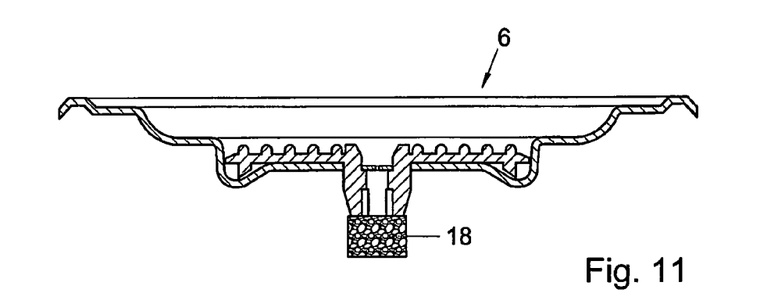
FIG. 11 shows a cross-sectional view of a holder provided with a froth-free restriction.

FIGS. 11 shows a variant to the exemplary embodiment of FIG. 10, the froth-free restriction being designed as a sintered portion 18 located downstream of an outflow opening of the holder 6. The outflow opening of the holder 6 is relatively large, so that it forms neither a fluid flow rate determining restriction nor a froth-forming fluid jet. In the exemplary embodiment of FIG. 11, the sintered portion 18 forms the fluid flow rate determining restriction.

Figure 12:
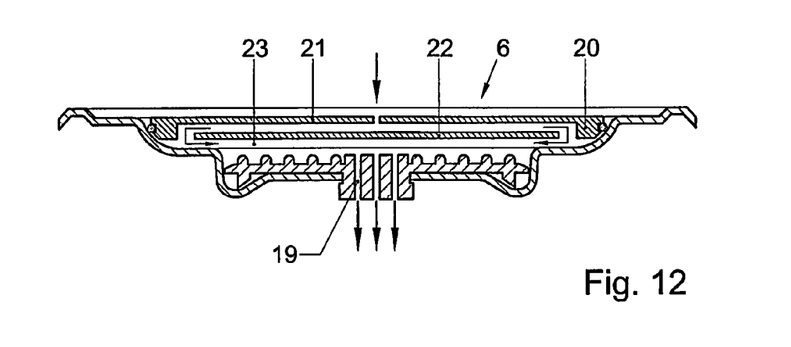
FIG. 12 shows a cross-sectional view of a holder with a froth-free restriction element separately placeable therein.

FIG. 12 shows a variant, while the holder 6 is provided with relatively large outflow openings 19 not forming a fluid flow rate determining restriction, therefore not forming a froth-free fluid jet.

In the holder 6, a froth-free restriction 20 in the form of a separate restriction element can be placed, which is provided with a relatively small restriction opening 21 and a partition 22 placed therebehind through which liquid entering through the restriction 21 is deflected radially outwards and hence enters into a chamber 23 in which a pad filled with a product, such as for instance a tea pad, can be received. The greatest pressure drop takes place across the restriction opening 21 which forms the flow rate determining restriction in the fluid path. The separate restriction element might also be placed under the pad in the holder.

It is also possible that the holder be designed as represented in FIG. 4 or as represented in any one of FIGS. 5-9, provided that from these last Figures, the froth-forming fluid jet forming restriction has been removed and that the fluid flow rate determining restriction is provided in the pad itself. To that end, the top sheet or the bottom sheet of the pad can be designed in a special manner, for instance the top sheet or the bottom sheet may be manufactured from filtering paper with a relatively restricted transmissivity to water. It is also possible that the filtering paper is partly covered with a layer which is not water transmissive. To that end, the filtering paper may be, for instance, partly coated, so that the total passage surface of the pad is limited. An example of such a pad is represented in cross-section in FIG. 13. This pad is provided with a bottom sheet 25 and a top sheet 26, which sheets are manufactured from filtering paper and are interconnected at a circumferential edge 28 by a sealing connection. In the space bounded by the bottom sheet 25 and the top sheet 26, the product 24 is situated, intended for preparing the beverage. This may be tea, coffee, cocoa, milk powder or another product with the aid of which a froth-free beverage is to be made. The froth-free restriction is formed by a coated layer 27 provided with passage openings 29. The passage openings 29 form the fluid flow rate determining froth-free restriction in the system. It will be clear that instead of, or in addition to the coating 27 on the top sheet, such a partial closure can also be provided on the bottom sheet 25.

Figure 13:
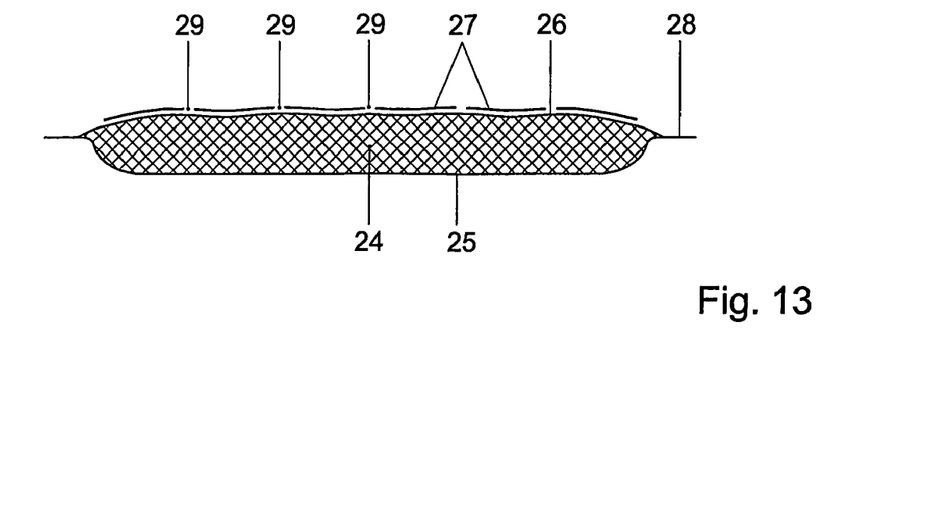
FIG. 13 shows a pad with a froth-free restriction integrally included therein.

Instead of a froth-free restriction integrally connected to the pad, as represented in FIG. 13, also, a separate froth-free restriction can be employed as already indicated in FIG. 12. Instead of a coating 27 provided with openings 29, use can also be made of a fully-covering coating having a certain water-transmissivity, which water-transmissivity, however, is considerably more restricted than that of ordinary filtering paper.

Figure 14:
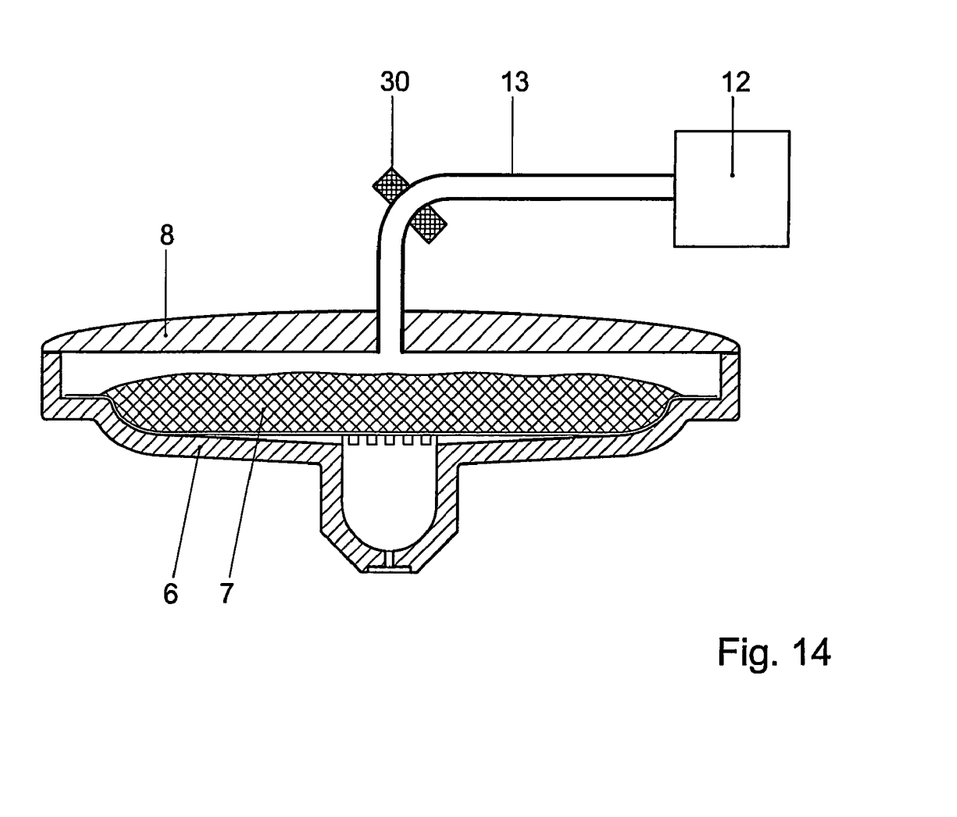
FIG. 14 shows a cross-sectional view of a holder with pad and a fluid supply duct with froth-free restriction connected thereto.

Finally, it is also possible to provide a fluid flow rate determining froth-free restriction in the duct 13 which connects the pump 12 to the holder 6. Such a restriction is schematically represented in FIG. 14 and is indicated with reference numeral 30. This froth-free flow restriction 30 can for instance be designed as a controllable valve forming a controllable or switchable flow restriction. Here, the flow restriction can be switched on utilizing a holder 6 with a relatively wide outlet not being a froth forming fluid jet forming restriction so that—even with the hot water unit 12 dispensing hot water at a pressure of 1-2 bar—the pressure drop substantially occurs across the froth-free restriction 30, thereby limiting the pressure drop across the pad to, for instance, less than 0.2 bar. Consequently, the pad will not be flowed-through too rapidly so that good extraction can take place. If the holder is then replaced with a different holder which is provided with a froth forming fluid jet forming froth restriction—when, with the aid of the hot water unit 12 hot water is fed to the assembly of coffee pad and holder while the flow restriction 30 is switched off and hence does not form a flow restriction—the pressure drop will substantially take place across the froth restriction. The result is that, on the one side, the pressure drop across the coffee pad is, again, smaller than the 1-2 bar mentioned so that the coffee pad is flowed-through at a desired flow velocity so that an optimal extraction of the coffee can take place. On the other side however, a powerful froth forming fluid jet will be obtained.

It is clear that, as desired, the pad can provide the system either with a froth forming restriction, or a froth-free restriction. Optionally, the pads may be provided with several compartments, while in the compartments different products are received, such as, for instance, tea and milk powder or coffee and milk powder. Further, in the holder of the system, instead of one, also two pads can be received, for instance a first pad containing coffee or tea and a second pad containing milk powder. Thus, for instance coffee or tea with milk can be prepared. All these variants are understood to fall within the framework of the invention as defined in the accompanying claims.

The invention claimed is:

1. A system for making a beverage, the system comprising:
a pad having a chamber configured to receive a product for making the beverage;
a fluid path extending at least through the product in the pad, while in use a fluid is introduced into the fluid path under super-atmospheric pressure;
wherein the system is designed for assuming a froth condition, in which a beverage with a froth layer is produced, and a froth-free condition, in which a beverage is produced substantially without a froth layer;
a first holder configured to receive the pad during use, the first holder includes a froth restriction so that the beverage is made with the froth layer;
wherein in the froth condition, the froth restriction of the first holder is provided in the fluid path substantially determining the fluid flow rate, and situated downstream of the product, the froth restriction of the first holder forms a fluid jet such that a froth layer is formed;
a second holder configured to receive the pad during use, the second holder does not include a froth restriction so that the beverage is made without the froth layer;

wherein in the froth-free condition, a froth-free restriction is provided in the fluid path substantially determining the fluid flow rate and does not form a froth-forming fluid jet.

2. A system according to claim 1, wherein the system forms part of a coffee maker.

3. A system according to claim 1, wherein the system is a coffee maker and the pad is a tea pad for preparing tea with the aid of the coffee maker, the coffee maker being provided with the holder for receiving at least the tea pad filled with the product and means for pressing hot water under pressure through the pad for obtaining an extract while the applied pressure of the water is, preferably, 1-2 bar, the tea pad being provided with a covering such as filtering paper which is at least partly transmissive to a liquid such as water and which is at least virtually non-transmissive to tea, while the covering comprises at least one space which is at least partly filled with tea.

4. A system according to claim 3, wherein the coffee maker comprises a hose upstream of the pad, while the froth-free restriction is provided in the hose.

5. A system according to claim 3, wherein the froth-free restriction is designed as a controllable valve.

6. A system according to claim 5, wherein the controllable valve forms a switchable froth-free restriction.

7. A system according to claim 5, wherein the controllable valve forms a controllable froth-free restriction.

8. A system according to claim 3, wherein the coffee maker is provided with a switchable froth-free restriction upstream of the holder for making tea with a tea pad in the holder while using the flow restriction, and for making coffee with a coffee pad in the holder without using the flow restriction.

9. A system according to claim 2, wherein the system is provided with an outflow path which begins in the bottom of the holder and ends outside the holder for dispensing the beverage, in which outflow path a semi-permeable material is provided.

10. A system according to claim 9, wherein the pad has a top and a bottom sheet designed from a semi-permeable material so that a great pressure drop can occur across the tea pad without the tea pad being flowed-through too rapidly.

11. The system according to claim 1, wherein the second holder comprises the froth-free restriction.

12. The system according to claim 1, wherein at least one of the first holder or second holder is removable.

13. The system according to claim 1, wherein the system is provided with at least two exchangeable holders.

14. The system according to claim 1, wherein the first holder can be formed from an assembly of the second holder and a restriction element.

15. The system according to claim 11, wherein the froth-free restriction forms part of the pad.

16. The system according to claim 11, wherein the froth-free restriction is located upstream of the product.

17. The system according to claim 11, wherein the froth-free restriction is located upstream of the pad.

18. The system according to claim 11, wherein the froth-free restriction forms part of a beverage preparing device, while the froth-free restriction is included in a duct system of the beverage preparing device which determines a part of the fluid path located upstream of the pad.

19. The system according to claim 11, wherein the froth free restriction is detachable from any other part of the system.

20. The system according to claim 19, wherein for preparing the froth-free beverage, the froth-free restriction forms an assembly with the pad.

21. The system according to claim 20, wherein, in use, the froth-free restriction element is located upstream of the pad.

22. The system according to claim 11, wherein the froth-free restriction comprises a semi-permeable material.

23. The system according to claim 11, wherein the froth-free restriction is switchable, whereby the froth-free restriction can be switched between a restricting position and a free position.

24. The system according to claim 23, wherein in the free position at least virtually no pressure drop is present across the switchable restriction.

* * * * *